April 7, 1959     S. SODERBERG     2,880,673
PRESSURE REGULATING SYSTEM FOR BEARINGS, AND THE LIKE
Filed June 18, 1954     2 Sheets-Sheet 1

INVENTOR.
Sten Soderberg
ATTORNEYS

April 7, 1959     S. SODERBERG     2,880,673
PRESSURE REGULATING SYSTEM FOR BEARINGS, AND THE LIKE
Filed June 18, 1954     2 Sheets-Sheet 2

INVENTOR.
Sten Soderberg
BY
ATTORNEYS

United States Patent Office 2,880,673
Patented Apr. 7, 1959

2,880,673

PRESSURE REGULATING SYSTEM FOR BEARINGS, AND THE LIKE

Sten Soderberg, Nutley, N.J., assignor to Leslie Co., Lyndhurst, N.J., a corporation of New Jersey Application June 18, 1954, Serial No. 437,786

4 Claims. (Cl. 103—11)

This invention relates to regulating systems, and more particularly to a system which may be used to bring stand-by or emergency equipment into operation when certain conditions occur. While the system could be used in various ways to meet and handle different contingencies, I have illustrated it serving to start a stand-by steam turbine driven lubricating oil pump for a marine power plant when the pressure at the most remote bearing drops below a predetermined minimum, for example 5 p.s.i., due to the inability of the shaft driven pump to supply the necessary volume of oil. The stand-by pump will quickly bring the bearing pressure up to a predetermined higher pressure, for instance 25 p.s.i., and automatically maintain this pressure until the pressure regulator is manually tripped to close it, except for minimum flow for idling of the pump. Manual tripping of the regulator resets it for its original minimum stand-by pressure setting.

In various installations, such as power plants for ships and the like, lubricant is delivered to the bearings by means of a pump driven from the main power shaft. Due to fluctuations in speed, reversing of the shaft in maneuvering the ship and other causes, conditions arise at times under which the desired minimum pressure may not be maintained at the bearings. I, therefore, provide a main regulator which controls the supply of steam to a stand-by turbine. This regulator is provided with a diaphragm chamber connected to the remote bearing whose pressure controls the operation of the system and is set to maintain the valve to the stand-by turbine open when the pressure is below a maximum pressure of, say, 25 p.s.i. This regulator may be of the type shown in my prior Patent No. 1,745,917.

An auxiliary regulator or pilot is arranged in the line to a valve in the main regulator which directly controls the main valve and this auxiliary pilot is provided with a diaphragm chamber connected to the bearing whose pressure controls the operation of the system. The diaphragm of the auxiliary pilot is set to operate when the pressure falls below a desired minimum, such as 5 p.s.i., and open a valve in the auxiliary pilot to supply steam to the main regulator and open the main valve.

A spring-loaded valve is arranged in the line between the bearing and the diaphragm chamber of the auxiliary regulator, the spring normally maintaining the valve in position to connect the diaphragm chamber of the auxiliary regulator to the bearing. The spring-loaded valve is also connected to the stand-by pump. When the pump is speeded up by the opening of the main regulator valve the pressure built up in the spring-loaded valve moves its valve member to a second position connecting the diaphragm chamber of the auxiliary regulator to a sump, or to atmosphere. Pressure in the diaphragm chamber drops to zero and the valve of the auxiliary regulator thus remains open until the apparatus is reset. The system is thus under control of the main regulator which quickly brings bearing pressure up to the high pressure setting and maintains it at that pressure.

To reset the system, the spring-loaded valve is moved to its initial position connecting the diaphragm chamber of the auxiliary regulator to the bearing whose pressure controls the operation of the system. The necessity of manually resetting provides an opportunity for checking the system to locate the cause of the drop in pressure which brought the stand-by pump into operation, before the plant is again placed under the control of the automatic regulator.

In the accompanying drawings I have shown one embodiment of the invention. In this showing:

Figures 1, 4:
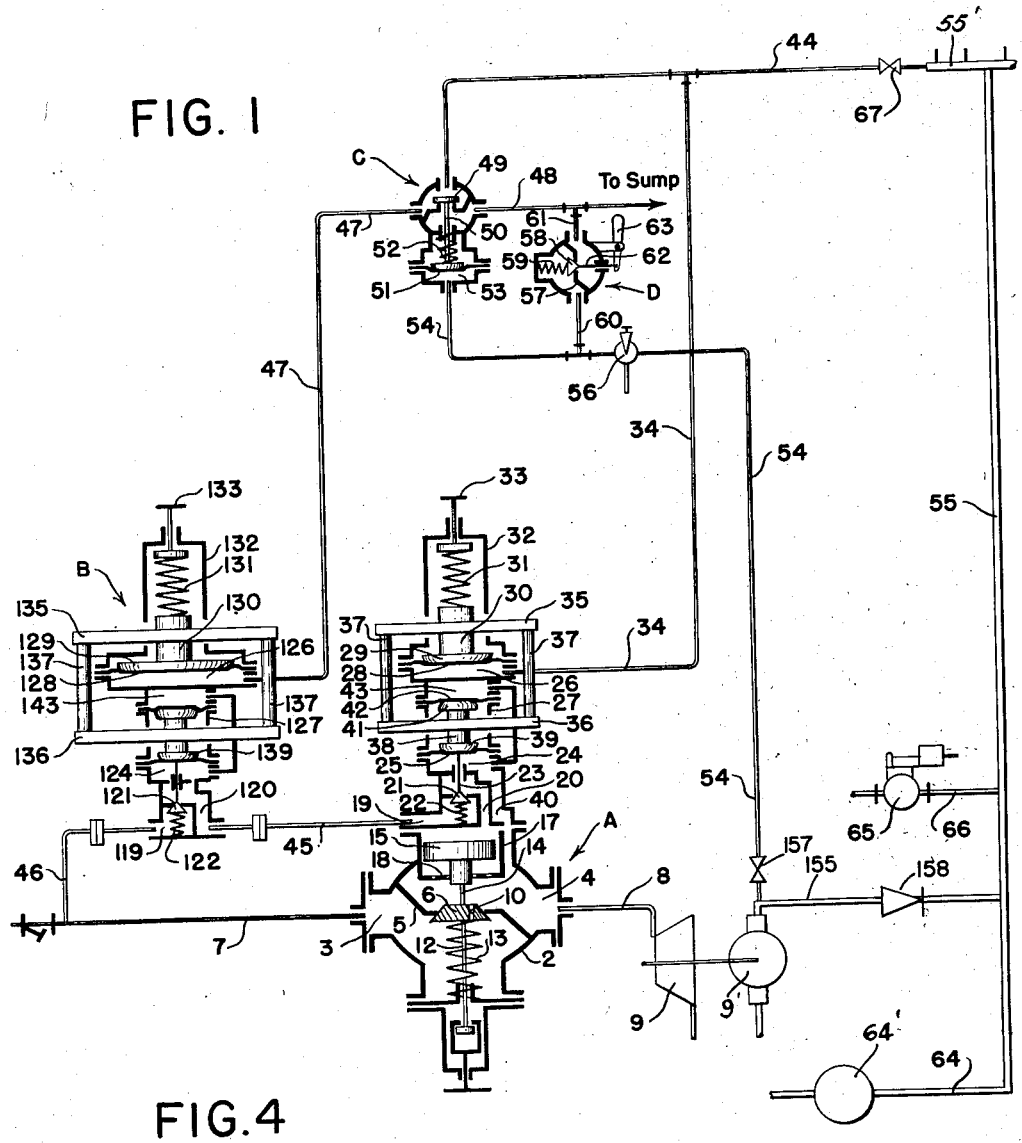
Fig. 1 is a diagrammatic view of the system.
Fig. 4 is a diagrammatic view of a by-pass around the valve of the main regulator.

Referring to Fig. 1, the unit A is a regulator generally similar to that shown in my prior patent. It includes a valve casing 2 having an inlet 3 and an outlet 4. Partition 5, within the valve casing, is provided with a valve seat, and valve 6 co-operates with this seat. Steam supply pipe 7 is connected to the inlet side of the valve and pipe 8 is connected to the outlet side. Pipe 8 is also connected to the steam driven turbine 9. This turbine drives pump 9' which pumps oil to the bearings to quickly bring the oil pressure to the predetermined high pressure, such as 25 p.s.i., when valve 6 is opened and steam delivered to it. A suitable by-pass may be provided to permit delivery of sufficient steam to turbine 9 to run it at an idling speed. The by-pass may be in the form of an orifice 10 in the valve member 6, or piping 11 of limited capacity connected to pipes 7 and 8 around the valve casing 2. (See Fig. 4.)

Valve 6 is provided with a lower stem 12 which is surrounded by a spring 13. The spring biases the valve toward a closed position. Upper stem 14 carries a piston 15 which is positioned in a cylinder 17. Partition 18, which separates the cylinder 17 from the outlet side of the valve, has one or more openings to maintain the lower end of the cylinder, beneath the piston, at the same pressure as the outlet side of the valve.

Above the cylinder 17 is a chamber 19, and this chamber is connected to the cylinder above the piston by a passage 20. Valve 21 controls communication between chamber 19 and passage 20. Valve 21 is biased toward a closed position by spring 22. Valve stem 23 extends into a chamber 24. A diaphragm 25 is mounted in this chamber and the valve stem abuts the diaphragm. An upper diaphragm chamber 26 is separated from diaphragm chamber 24 by section 27. Diaphragm 28 is mounted in the upper diaphragm chamber. A head 29 engages this diaphragm, the head being connected to a stem 30. The stem is engaged by spring 31 in housing 32. An adjusting screw 33 extends from the housing. This permits adjustment of the force of spring 31 exerted on head 29 and diaphragm 28. A pipe 34 is connected to diaphragm chamber 26 beneath the diaphragm 28.

Cross arm 35 is connected to stem 30. It is also rigidly connected to lower cross arm 36 by rods 37. The lower cross arm is connected to stem 38. This stem carries a head 39 at its lower end. Head 39 abuts diaphragm 25 in chamber 24. Chamber 24 is connected to the outlet side of the valve casing by a passage 40. Stem 38 also has a head 41 on its upper end, which engages a diaphragm 42 in chamber 43.

Pipe 34 is connected to a pipe 44 which extends to the bearing whose pressure is to operate the regulator, and therefore maintains chamber 26 at the pressure of the bearing. In the hypothetical case set forth earlier herein, spring 31 is set to depress the diaphragm at any pressure below 25 p.s.i. This also lowers stem 38 by means of the connection through cross arms 35 and 36 and rods 37. This, in turn, retains valve 21 in an open position. The pressure of the outlet side of the valve casing is maintained in chamber 24 through passage 40.

Steam is supplied to chamber 19 by pipe 45 and this pipe is connected to an auxiliary pilot B. Auxiliary pilot B is set to operate at the predetermined low pressure and deliver steam to chamber 19. Upon operation of the auxiliary pilot and delivery of steam to chamber 19, the valve 21, of course being in open position, the steam flows into cylinder 17 to lower the piston 15 and open main valve 6. This supplies steam from pipe 7 to the turbine driven pump 9, which immediately begins to increase its discharge pressure. Auxiliary pilot B is identical to those parts of the main regulator above the main valve and piston cylinder 17. As shown, chamber 119 is connected to a passage 120. Passage 120 is in turn connected to pipe 45 to deliver steam to chamber 19 of the main regulator and chamber 119 is connected to the supply pipe 7 by a pipe 46. Without describing each part in detail, the parts 119 to 143 of auxiliary pilot B are identical to parts 19 to 43 of the main regulator. Diaphragm chamber 126 is connected to pipe 44, similarly to chamber 26, but in this instance the connection is made through a spring-loaded, three-way valve C. The spring 131 permits diaphragm 128 to remain in raised position upon existence of a pressure, above the minimum pressure of 5 p.s.i., in diaphragm chamber 126. When valve C is in position to permit fluid to flow to chamber 126 and the pressure in the bearing falls to the predetermined minimum, spring 131 lowers diaphragm 128 and opens valve 121. This supplies steam to chamber 19 of the main regulator and opens main valve 6. At the reduced pressure valve 21, of course, is in open position because the pressure is necessarily below the upper limit of 25 p.s.i.

As shown, pipe 47 extends from auxiliary pilot B to spring-loaded valve C. This valve is also connected to pipe 44, leading to the bearing to which the apparatus is connected, and has a third connection 48 to a sump. Valve member 49 permits communication between pipes 44 and 47 to establish a pressure in diaphragm chamber 126 corresponding to the bearing pressure, when in one position, and between pipes 47 and 48 to vent the pipe 47 to the sump when in a second position. This valve has a stem 50 connected to a diaphragm 51 in the valve casing. Spring 52, surrounding the stem, exerts downward pressure on the diaphragm and valve stem to normally retain the valve in its first or operative position. Diaphragm chamber 53 below the diaphragm is connected to a pipe 54. When pressure in diaphragm chamber 53 overcomes the force of spring 52, the valve is moved to its second position to vent diaphragm chamber 126 of auxiliary pilot B to the sump.

Pump 9' is provided with a discharge pipe 155. A delivery pipe 55 is connected to the discharge pipe. A check valve 158 is arranged in the discharge pipe between the pump and the delivery pipe. Delivery pipe 55, delivers oil to a manifold 55'. The manifold is arranged along a reduction gear case (not shown) and is provided with connections to the bearings to be lubricated. Pipe 54 is also connected to discharge pipe 155. A restriction, generally in the form of a partially closed manually operated valve, is arranged in pipe 54. A check valve 157 is also arranged in this pipe adjacent the point where it connects to discharge pipe 155. When main valve 6 is opened to start the oil pump 9' a pressure is quickly built up in diaphragm chamber 53. Valve 49 is moved to its second position when this pressure overcomes the force of spring 52. This disconnects diaphragm chamber 126 from pipe 44 and connects it to the sump thereby reducing the pressure in the diaphragm chamber to zero. This opens valve 121 of auxiliary valve B fully, resulting in full opening of main valve 6 and fast acceleration of pump 9', quickly bringing the bearing up to the maximum setting where it, due to the action of the main regulator A, will hold it until the spring-loaded valve C is reset and the auxiliary pilot B is restored to its original standby condition. It is thus necessary to reset the spring-loaded valve C to restore the regulator to operative condition.

Pipe 54 is also connected to a manually operated valve D which functions to return the oil pump to idling speed and restore the pressure regulator to its low pressure standby adjustment. As shown, valve D comprises a valve casing having a partition 57 which forms a valve seat. A valve 58 cooperates with this seat. Valve 58 is biased to a closed position by a spring 59. As shown, the inlet side of the valve is connected to pipe 54 by a branch pipe 60. The outlet side is connected to pipe 48 which leads to the sump by a pipe 61. When this valve is opened, the pipe 54 and diaphragm chamber 53 are vented. The pressure in diaphragm chamber is thus reduced to zero, and spring 52 restores valve 49 to its initial position. This connects diaphragm chamber 126 to pipe 44 and retains valve 121 in closed position as long as the pressure in the bearing connected to pipe 44 remains above the predetermined low limit.

Valve 58 is provided with a stem 62 which may be connected to an operating lever 63. Any other suitable means may, of course, be employed for manually operating the valve 58. In Fig. 1, the main oil pipe 55 is illustrated with suitable connection 64 leading to the pump 64' by means of which oil is normally supplied to the bearings. It also may be connected to an over-flow valve 65 arranged in a branch pipe 66. The over-flow valve is set to operate at the maximum pressure, that is 25 p.s.i., in the hypothetical instance herein discussed. A valve 67 may be placed in pipe 44 near where it joins pipe 55. This valve is normally locked in an open position but may be closed to disconnect the regulator or render it inoperative.

In the hypothetical case of a predetermined high pressure of 25 p.s.i., spring 31 is set to depress diaphragm 28 at any pressure below this. This retains valve 21 in open position. As long as the pressure remains above the minimum, in the hypothetical case 5 p.s.i., main valve 6 remains closed, because even though valve 21 is open, valve 121 of the auxiliary regulator is closed and no steam can flow through pipe 45. When the pressure in the system falls below 5 p.s.i., spring 131 depresses diaphragm 128 to open valve 121. Steam then flows from main supply line 7, through pipe 46, chambers 119 and 120 of the auxiliary regulator, pipe 45, chambers 19 and 20 to cylinder 17. This lowers piston 15 and opens main valve 6. Steam is then supplied to turbine 9 to drive standby pump 9' and build up the pressure in delivery pipe 55. Diaphragm chamber 128 has been connected to the system through pipes 44 and 47 and valve C, the valve 49 being in closed position. As pressure builds up in delivery pipe 55, it also builds up in pipe 54 which is connected to it. This increases pressure in diaphragm chamber 53, causing diaphragm 51 to open valve 49 against the pressure of spring 52. Pipe 47, leading from diaphragm chamber 126 is then connected to the sump reducing the pressure in diaphragm chamber 126 to zero. Valve 121 will then remain fully open to fully open main valve 6 and bring the system to maximum pressure. The main regulator A will hold the system at maximum pressure until the auxiliary regulator is restored to its original condition. Manually operated valve D is actuated to move the valve member 58 from its seat. This vents diaphragm chamber of valve C through pipes 54 and 60 and pipe 61 leading to the sump. Spring 52 then restores valve 49 to its initial position connecting pipe 47 to the system through pipe 44. As soon as the pressure builds up in diaphragm chamber 126, valve 121 is closed. The parts then remain in standby condition.

as long as the pressure remains above the predetermined minimum.

Figure 2:
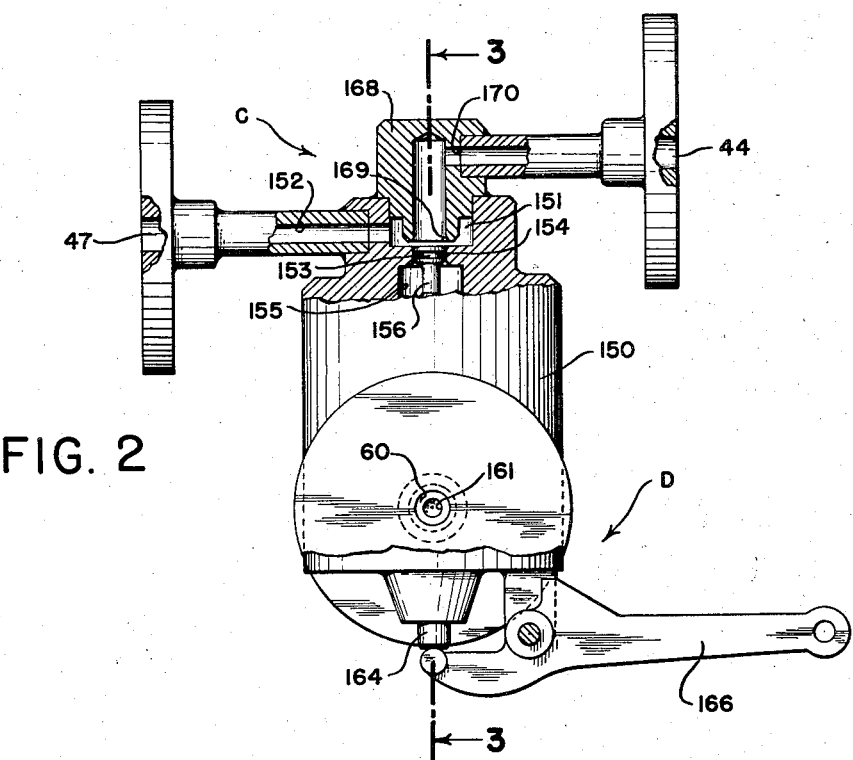
Fig. 2 is an elevation of a valve, partly in section, which performs the functions of the spring-loaded, three-way valve and the manually operated valve of Fig. 1.
Figure 3:
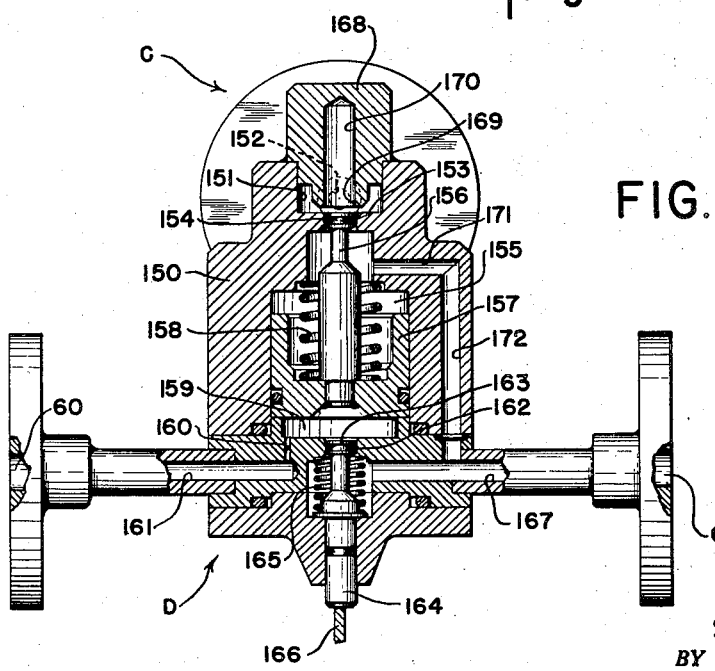
Fig. 3 is a vertical, sectional view on line 3—3 of Fig. 2.

In Figs. 2 and 3 of the drawings I have shown the three-way valve C and the manually operated valve D built in a single unit. As shown, valve casing 150 is provided with a chamber 151 and this chamber communicates with a passage 152 to which pipe 47 is connected. A valve 153 cooperates with valve seat 154 in this chamber. Above chamber 151, cap 168 has a valve seat 169 at its lower end. Passage 170 extends through the cap and is connected to pipe 44. Beyond the valve seat 154, the casing forms a cylinder 155. Valve stem 156 is connected to piston 157 in this cylinder. Spring 158 engages the piston and the valve casing to exert a force on the piston in opposition to pressure exerted on the under side of the piston. Beneath the piston the chamber 159, corresponding to diaphragm chamber 53 of valve C, is connected to passage 161 to which pipe 54 is connected. By making the port 160, which connects passage 161 with chamber 159, of small diameter, the valve 56 in pipe 54 may be eliminated.

Chamber 159 functions in place of diaphragm chamber 53 and the inlet side of valve D. It is provided with valve seat 162, and valve 163 cooperates with this seat. Valve stem 164 extends from the bottom of the casing. As shown, the valve stem is surrounded by spring 165 to normally retain the valve in closed position. It may be opened manually by lever 166 which engages the projecting end of the valve stem. When this valve is opened, pressure in pipe 54 is vented. Beneath valve seat 162 valve casing 150 is provided with a passage 167 which is connected to pipe 61.

With valves C and D made in the one unit 150, pipe 44 is normally connected to pipe 47 to maintain a pressure in diaphragm chamber 126 of the auxiliary pilot B equal to that of the remote bearing, through passage 170, chamber 151 and passage 152, valve 153 being in engagement with valve seat 154 and out of engagement with valve seat 169. When the pump 9' is started by the regulator, pressure in pipe 54 is exerted on the under side of piston 157, overcoming the force of spring 158 and moving valve 153 from seat 154 into engagement with seat 169. This disconnects diaphragm chamber 126 of the auxiliary pilot from the pipe 44 and vents it. A cross passage 171 extends from chamber 155 to a passage 172. This passage in turn connects to passage 167, leading to the sump connection. To re-set the regulator, valve 163 is opened, venting chamber 159 through passage 167. Spring 158 then returns valve 153 to its initial position, connecting diaphragm chamber 126 of the auxiliary pilot to pipe 44.

While apparatus consisting of a main regulator and a pilot or auxiliary regulator has heretofore been employed for various purposes, the provision of the spring-loaded valve which connects the diaphragm chamber of valve D to atmosphere very shortly after the regulator has functioned to operate the standby turbine 9 is an important feature of my invention, and, as stated, the necessity of manually setting the valve permits the entire system to be inspected for leakage or other causes of the drop in pressure than the mere variation of speed of the main power shaft before the regulator is again restored to operative conditions. The valve D is one means for operating the valve C and restoring the regulator to operative conditions. Other means for connecting diaphragm chamber 53 to atmosphere could, of course, be used in its stead.

I claim:

1. Control apparatus comprising a main regulator and an auxiliary regulator, a main valve in the main regulator, a fluid pressure operated standby pump, a steam supply pipe connected to the inlet side of the main valve, a feed pipe connecting the outlet side of the main valve to the standby pump, a discharge pipe connected to the pump, a delivery pipe connected to the discharge pipe, means for regulating the main valve, a connection between said regulating means and the delivery pipe to regulate the opening of the main valve by the pressure in the delivery pipe, a valve in the auxiliary regulator, a connection from the steam supply pipe to the inlet side of said valve, means in the main regulator to open the main valve, a connection between said main valve opening means and the outlet side of the valve of the auxiliary regulator to supply steam to said valve opening means when the valve of the auxiliary regulator is opened; control means for the valve of the auxiliary regulator, a connection between the control means of the auxiliary regulator and the delivery pipe to permit the control means to open the valve of the auxiliary regulator when the pressure in the delivery pipe falls below a predetermined minimum; a valve in said connection, which in one position maintains the pressure in the connection between said control means and the delivery pipe, pressure operated means to move said last mentioned valve to a second position and connect the control means of the auxiliary regulator to atmosphere, and a connection between said pressure operated means and the standby pump to deliver fluid to said pressure operated means and maintain said last mentioned valve in its second position while the standby pump is in operation.

2. Apparatus in accordance with claim 1 in which the valve in the connection between the control means of the auxiliary regulator and the delivery pipe comprises a three-way valve normally biased toward its first position to connect said control means of the auxiliary regulator to the delivery pipe, and is actuated by an increase in pressure in the discharge pipe when the standby pump is started to move the valve to a second position and connect the said control means to atmosphere.

3. Apparatus in accordance with claim 2 in which the three-way valve is provided with a diaphragm chamber connected to the discharge pipe, and in which a diaphragm in said chamber is connected to the valve.

4. Apparatus in accordance with claim 3 in which a manually operated valve is connected to the diaphragm chamber of the three-way valve, and said valve when opened connects the diaphragm chamber to a vent to permit the valve biasing means of the three-way valve to restore the connection between the control means of the auxiliary regulator and the delivery pipe.

References Cited in the file of this patent

UNITED STATES PATENTS

| | | |
|---|---|---|
| 1,490,942 | Schmidt | Apr. 22, 1924 |
| 1,647,135 | Johnson | Nov. 1, 1927 |
| 1,745,917 | Soderberg | Feb. 4, 1930 |
| 2,347,471 | Dornbrook | Apr. 25, 1944 |